US010814674B2

(12) United States Patent
Wilson et al.

(10) Patent No.: US 10,814,674 B2
(45) Date of Patent: Oct. 27, 2020

(54) HEAVY DUTY TIRE

(71) Applicant: The Goodyear Tire & Rubber Company, Akron, OH (US)

(72) Inventors: John David Wilson, Clinton, OH (US); Gregory Alan Schessler, Stow, OH (US); Todd James Spencer, Hartville, OH (US); David Ray Hubbell, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 261 days.

(21) Appl. No.: 15/706,983

(22) Filed: Sep. 18, 2017

(65) Prior Publication Data
US 2018/0086144 A1 Mar. 29, 2018

Related U.S. Application Data

(60) Provisional application No. 62/399,449, filed on Sep. 25, 2016.

(51) Int. Cl.
*B60C 11/01* (2006.01)
*B60C 11/00* (2006.01)
(Continued)

(52) U.S. Cl.
CPC ............. *B60C 11/01* (2013.01); *B60C 9/28* (2013.01); *B60C 11/0083* (2013.01);
(Continued)

(58) Field of Classification Search
CPC ..... B60C 11/01; B60C 15/0628; B60C 9/028; B60C 9/185; B60C 2009/1878;
(Continued)

(56) References Cited

U.S. PATENT DOCUMENTS 5,553,646 A * 9/1996 Ando .................. B60C 3/04
152/209.14
5,616,195 A 4/1997 Marquet
(Continued)

FOREIGN PATENT DOCUMENTS

EP 1120231 A1 8/2001
JP H0725203 B2 * 3/1995 .............. B41M 5/44
(Continued)

OTHER PUBLICATIONS

Machine translation of JP2010274790 provided (Year: 2010).*
(Continued)

*Primary Examiner* — Robert C Dye
*Assistant Examiner* — Debjani Roy
(74) *Attorney, Agent, or Firm* — June E. Rickey

(57) ABSTRACT

A heavy-duty tire is described herein. The heavy duty tire includes a carcass, a tread located radially outward of the carcass, and a tread having a plurality of lugs. The lugs extend radially outward from an inner tread and are located between the first and second lateral tread edges. The tread further includes a first row of lugs extending from the tread lateral edge axially inwards toward the centerplane, and a second row of lugs extending from the opposite tread lateral edge and axially inwards toward the centerplane. The lugs of the first and second rows are separated by a plurality of shoulder grooves, wherein the first row of lugs are aligned with the second row of lugs, a center row of lugs located between a first and second offset lug, wherein all of the lugs in each row are aligned circumferentially. wherein said tire has a molded base width in the range of 44-50 mm. The heavy-duty tire wherein the shoulder drop ranges from 64 mm to 120. Wherein the gauge of the shoulder wedge ranges from 70-89 mm, and more preferably in the range of 75-85 mm.

9 Claims, 13 Drawing Sheets

(51) Int. Cl.
*B60C 15/06* (2006.01)
*B60C 9/28* (2006.01)
*B60C 11/03* (2006.01)

(52) U.S. Cl.
CPC ...... *B60C 11/0332* (2013.01); *B60C 15/0628* (2013.01); *B60C 2200/065* (2013.01)

(58) Field of Classification Search
CPC . B60C 15/00; B60C 11/0083; B60C 15/0603; B60C 2015/061
See application file for complete search history.

(56) References Cited

U.S. PATENT DOCUMENTS

| | | | |
|---|---|---|---|
| 5,772,811 A * | 6/1998 | Ueyoko | B60C 3/04 152/454 |
| 5,849,118 A | 12/1998 | Matsumoto | |
| 6,408,908 B1 | 6/2002 | Scarpitti et al. | |
| 6,866,734 B1 | 3/2005 | Ridha | |
| 7,275,573 B2 | 10/2007 | Nguyen | |
| 8,151,841 B2 * | 4/2012 | Ebiko | B60C 9/22 152/209.14 |
| 8,191,592 B2 * | 6/2012 | Andonian | B60C 9/2006 152/209.6 |
| 9,139,050 B2 | 9/2015 | Venkataramani | |
| 2006/0269636 A1 | 11/2006 | Miyamae | |
| 2007/0113946 A1 * | 5/2007 | Manno | B60C 9/2006 152/531 |
| 2007/0175566 A1 | 8/2007 | Frank et al. | |
| 2011/0114239 A1 * | 5/2011 | Venkataramani | B60C 15/06 152/539 |
| 2015/0079211 A1 | 3/2015 | Satoh et al. | |
| 2016/0137009 A1 * | 5/2016 | Tauchi | B60C 3/04 152/454 |
| 2018/0086146 A1 | 3/2018 | Wilson et al. | |

FOREIGN PATENT DOCUMENTS

| | | |
|---|---|---|
| JP | H11278014 A | 10/1999 |
| JP | 2003136911 A | 5/2003 |
| JP | 2010274790 A | 12/2010 |

OTHER PUBLICATIONS

Machine translation of JPH11278014 provided (Year: 1999).*
European Search Report dated May 16, 2018 for Application Serial No. EP17192774.

* cited by examiner

HEAVY DUTY TIRE

FIELD OF THE INVENTION

The present invention relates to pneumatic tires, and more particularly to very large, wide base tires for use for example, on construction vehicles such as earth movers, and rigid haul dump trucks.

BACKGROUND OF THE INVENTION

In very large tires having a diameter of 80 inches or more, tire operating conditions can be severe because of the extreme tire loading and off-road conditions. Furthermore, the speed of the vehicles may be high, which can result in excessive heat buildup in the tire. When a very large off the road tire is used in the oil sands environment, the tires are subjected to extreme dynamic and static loads. During vehicle operation, the tire may bounce through the thick, viscous sand conditions. The tire conditions result in the tire bouncing and deflecting, which can result in the tire failing earlier that its predicted life due to heat, high strain and bead failure. Thus it is desired to have an improved tire which is a cooler running tire.

Definitions

"Aspect Ratio" means the ratio of a tire's section height to its section width.

"Axial" and "axially" means the lines or directions that are parallel to the axis of rotation of the tire.

Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 7° to 36° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"net to gross ratio" means the ratio of the area of the tread in the footprint that contacts the road to the total area of the tread in the footprint.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 7A illustrates a cross-sectional view of the shoulder portion of the control tire, while

FIG. 8A illustrates a cross-sectional view of the lower sidewall gauge of the control tire, while

FIG. 10A illustrates the cross-sectional view of a heat map of the control tire at 120% rated load, while

FIG. 11A illustrates the cross-sectional view of the bead and flange area of the control tire at 120% load, while

FIG. 12A illustrates a footprint pressure map of the control tire at 120% rated load, while

DETAILED DESCRIPTION OF THE INVENTION

Figure 1:
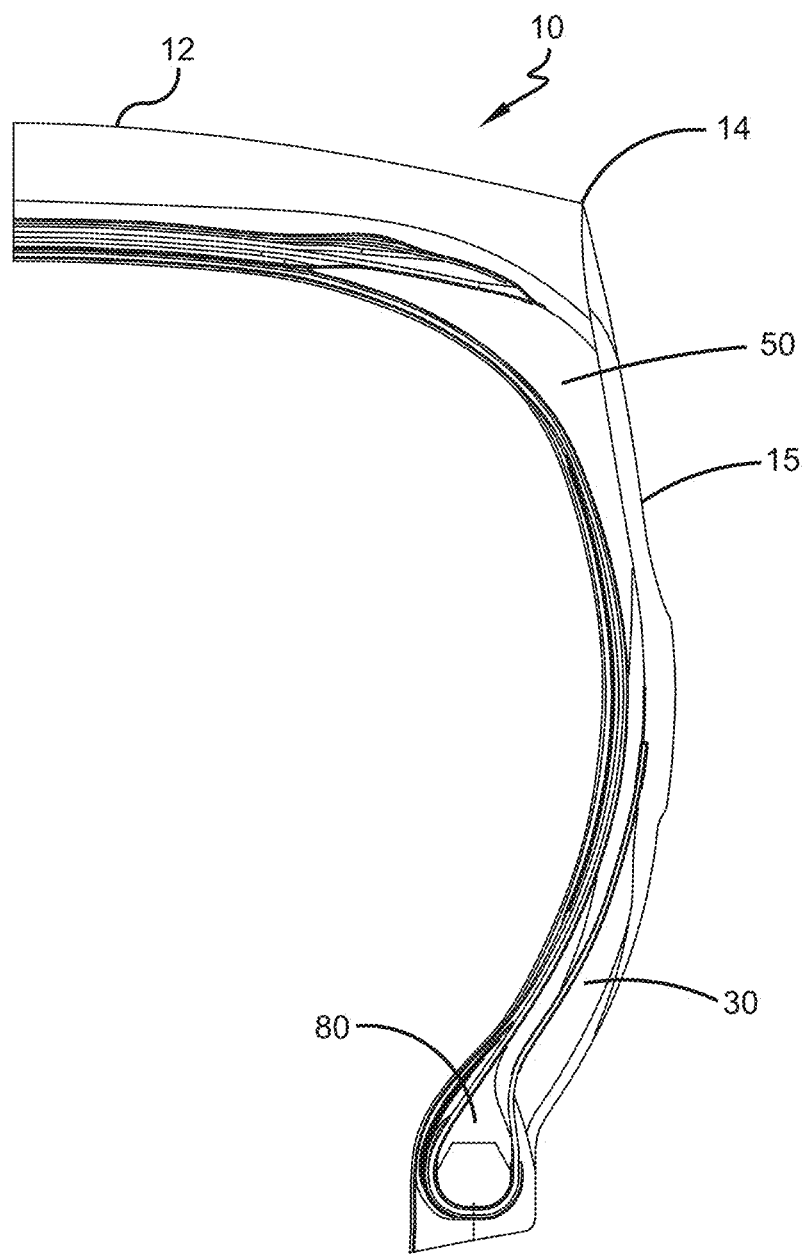
FIG. 1 illustrates a first embodiment of a tire 10 of the present invention.

FIG. 1 illustrates a first embodiment of a tire 10 of the present invention. The tire may have a nominal rim diameter of 35 inches or more. The tire 10 has an outer ground engaging tread portion 12 which has axially outer lateral edges 14. Sidewalls 15 extend radially inward from the tread lateral edges 13,14 and terminate in a pair of bead regions 16 having an annular bead core 20. The tire 10 is further provided with a carcass which has a reinforcing ply structure 18 which extends from bead region to bead region. The tire may further include breakers 22 and other tire components known to those skilled in the art.

Figure 2B:
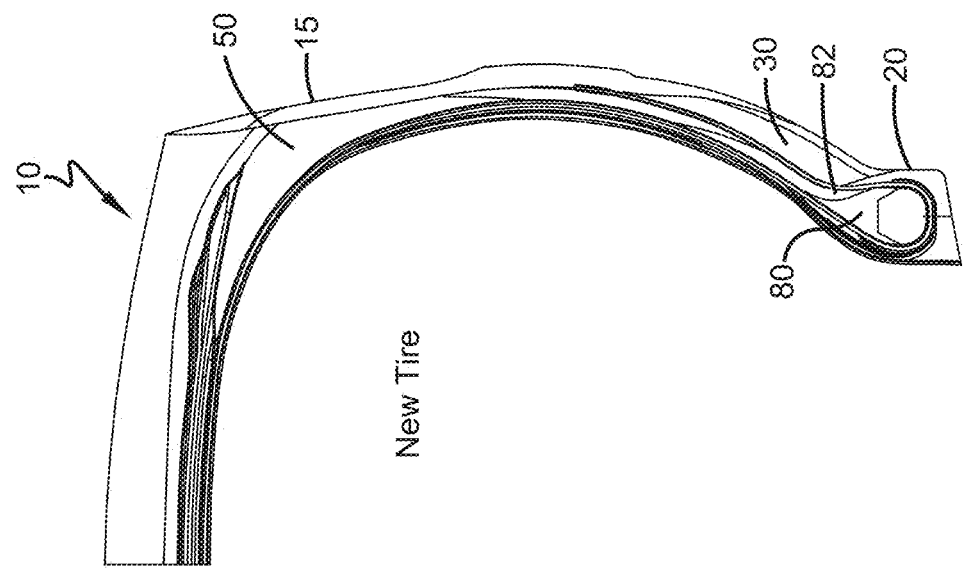
FIG. 2a illustrates a cross-sectional view of a control tire and FIG. 2b illustrates a cross-sectional view of the tire of the present invention.
Figure 2A:
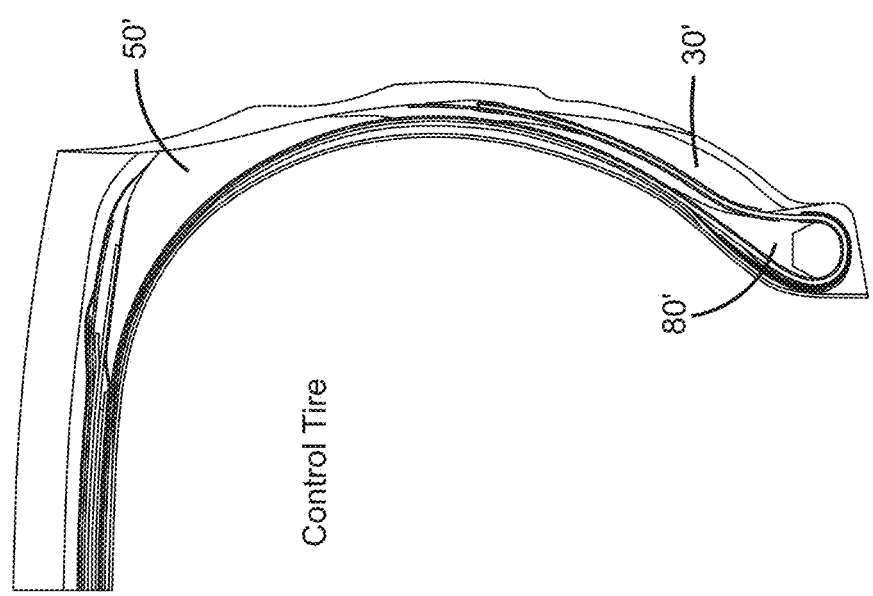
Figure 3:
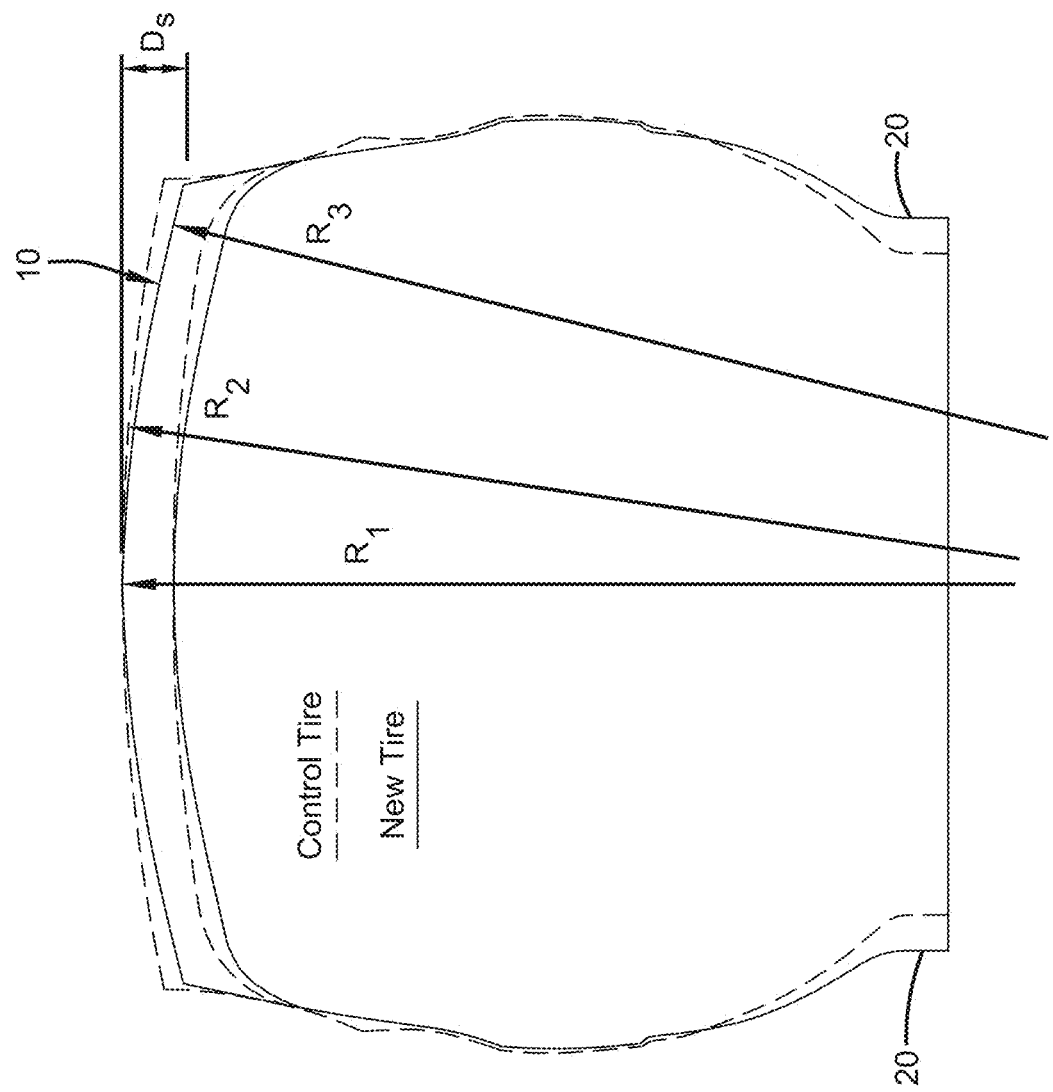
FIG. 3 illustrates the cross-sectional view of the cross-sectional profile of the tire of the present invention, while the control tire profile is shown in phantom.
Figure 12A:
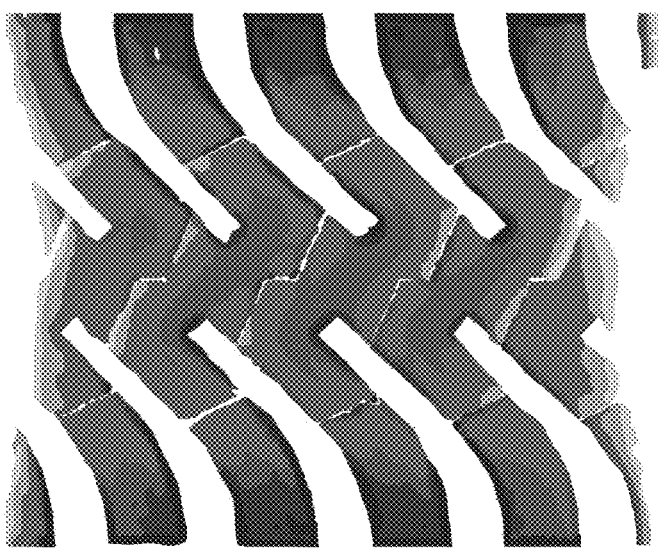
Figure 12B:
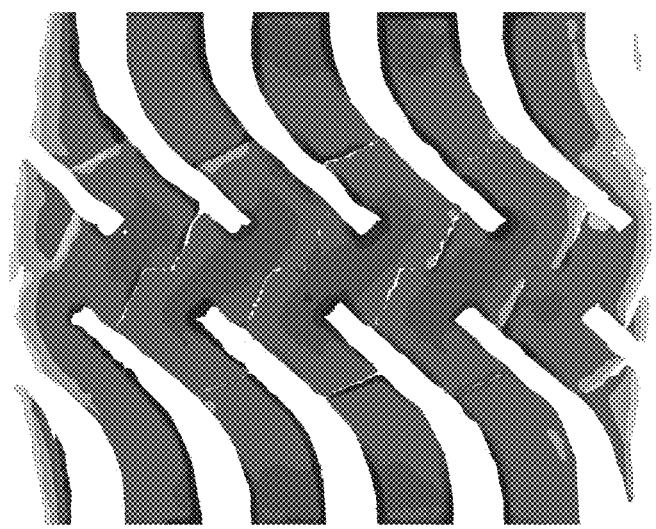
FIG. 12B illustrates a footprint pressure map of the tire of the present invention, at the same conditions.
Figure 13:
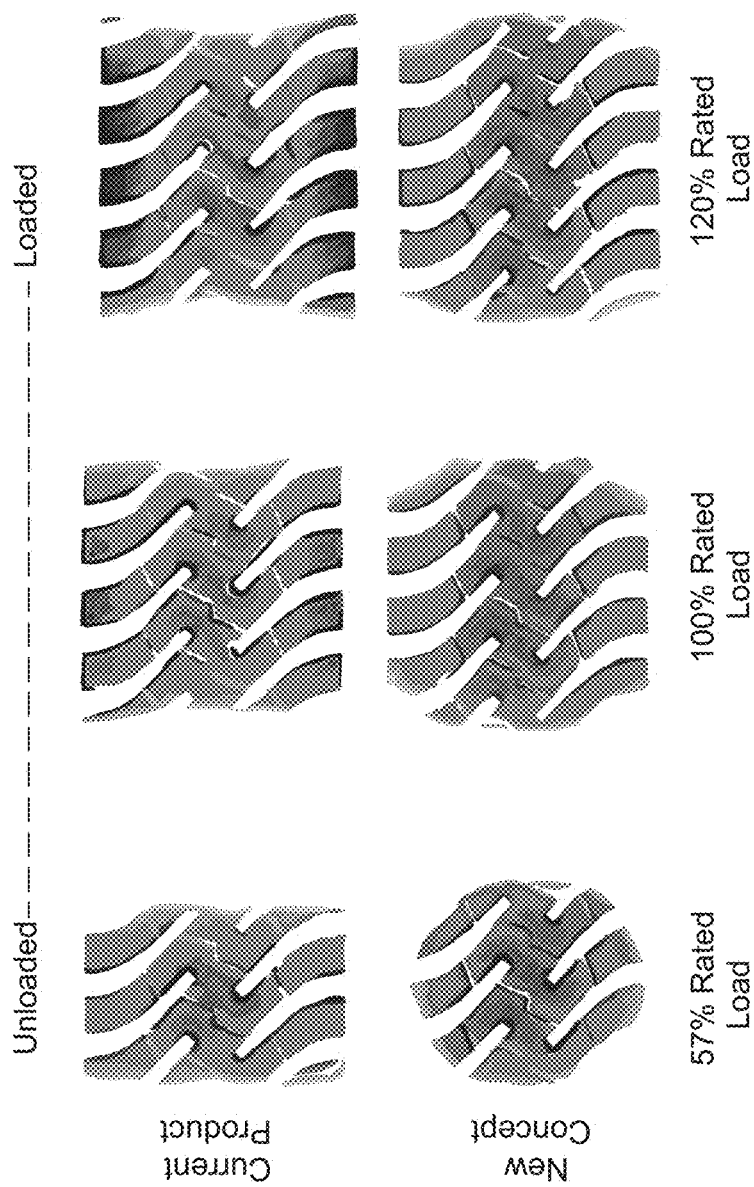
FIG. 13 illustrates a footprint pressure map of the control tire and tire of the present invention at an unloaded condition, a 100% rated load condition, and 120% rated load condition.

FIG. 2a illustrates a control tire and FIG. 2b illustrates the tire of the present invention. FIG. 3 illustrates the mold profile of the control tire and the mold profile tire of the present invention. As shown in FIG. 3, the tire 10 of the present invention has a wider molded base width, so that the bead areas 20 are spaced farther apart. Preferably, the molded base width is in the range of 40 to 50 inches, more preferably in the range of 44-49 inches. The reduction of molded base width results in a reduced section width. Preferably, the molded base width is wider than the rim width. The reduced molded base width results in a more stable tire, and reduced section width that has lower rolling resistance. The reduced molded base width also results in a crown of the tire that has increased load bearing resulting in a more rounded footprint, as shown in FIG. 12, with pressure reduced in the shoulders.

Figure 4:
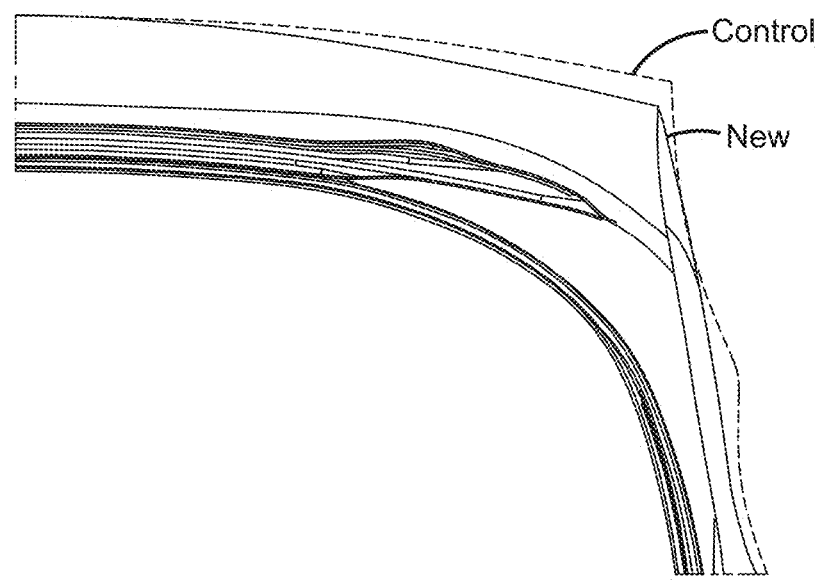
FIG. 4 illustrates the cross-sectional view of the shoulder portion of the tire of the present invention, while the control tire shoulder portion is shown in phantom.
Figure 5B:
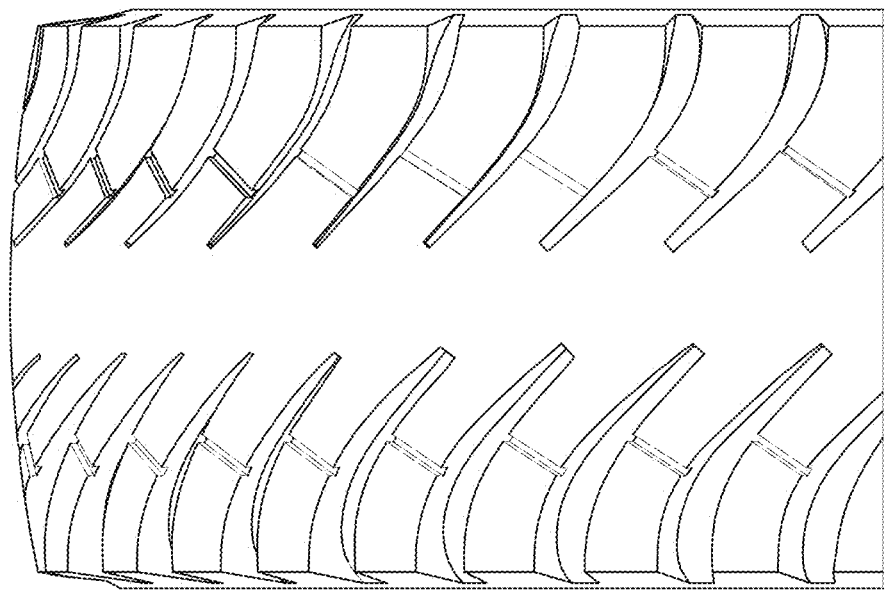
FIG. 5A illustrates a front view of the tread portion of the control tire, while FIG. 5B illustrated a front view of the tread portion of the tire of the present invention.
Figure 5A:
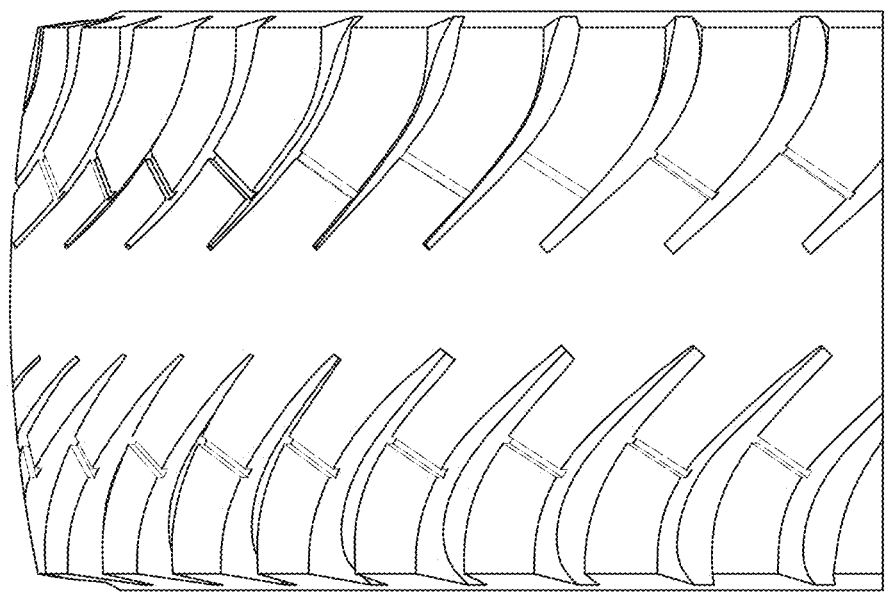

As shown in FIGS. 3 and 4, the shoulder drop (the difference between the crown outermost radial dimension and the shoulder radius) has been increased as compared to the control tire. Preferably, the shoulder drop D ranges from 64 mm to 120 mm, and more preferably in the range of 85-115 mm, and more preferably 93-97 mm. As shown in FIG. 5b as compared to the control tire in FIG. 5a, the tread profile has more rounded edges. As shown in FIG. 3, the tread has a multi radius tread, R1 in the center, R3 at the shoulder, and R2 therebetween. In this example, R1 is 2325 mm, R2 is 1800 mm, and R3 is 1400 mm. R1 may range from 2200-2500 mm, R2 is less than R1, R2 may range from 1600-2100 mm, and R3 may range from 1000-1500 mm.

Figure 6A:
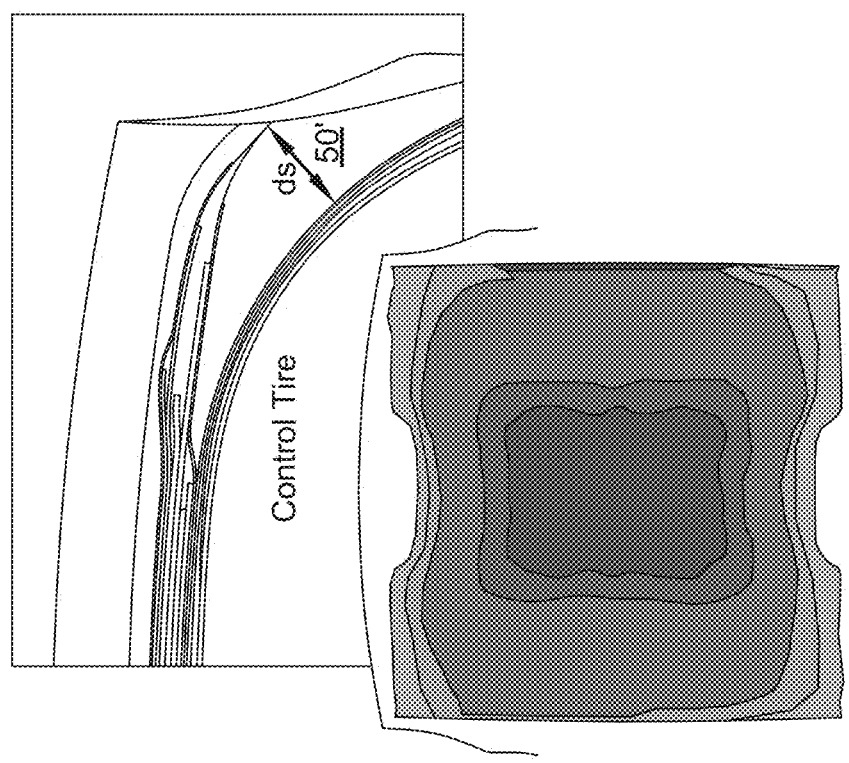
FIG. 6A illustrates a front view of the shoulder portion and footprint of the control tire, while FIG. 6B illustrated a front view of the shoulder portion and footprint of the tire of the present invention.
Figure 6B:
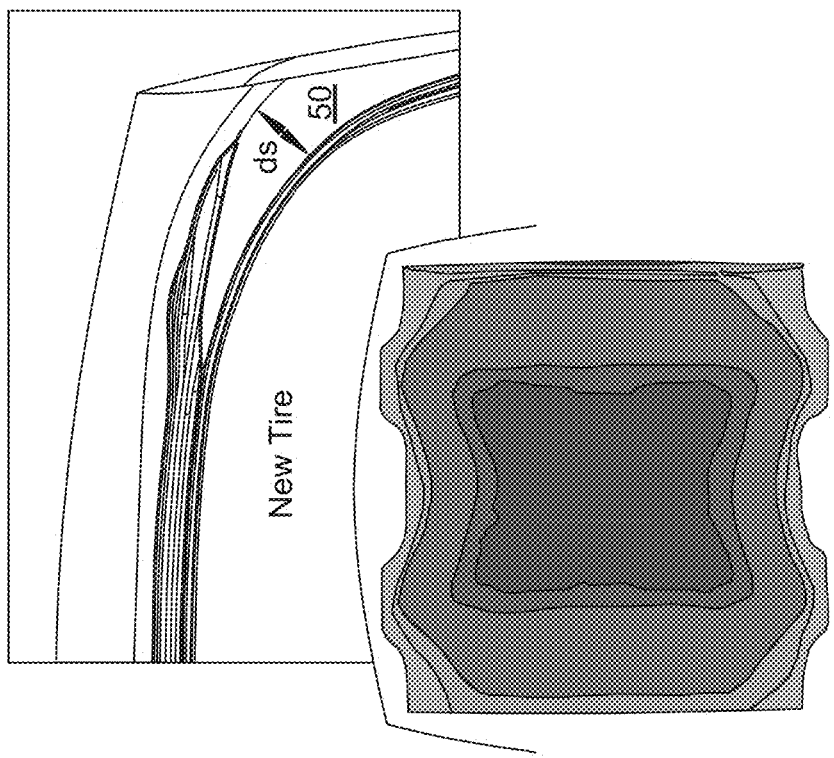

The tire of the present invention also has a reduced shoulder wedge 50. The shoulder wedge gauge ds is preferably in the range of 70-89 mm, and more preferably in the range of 75-85 mm. The reduction in shoulder wedge gauge results in lower rolling resistance, reduced heat due to the reduced mass, and a rounder footprint as shown in FIG. 6B, as compared to the control tire footprint shown in FIG. 6A. The reduced upper wedge gauge allows the shoulder region of the footprint to round out.

Figure 7A:
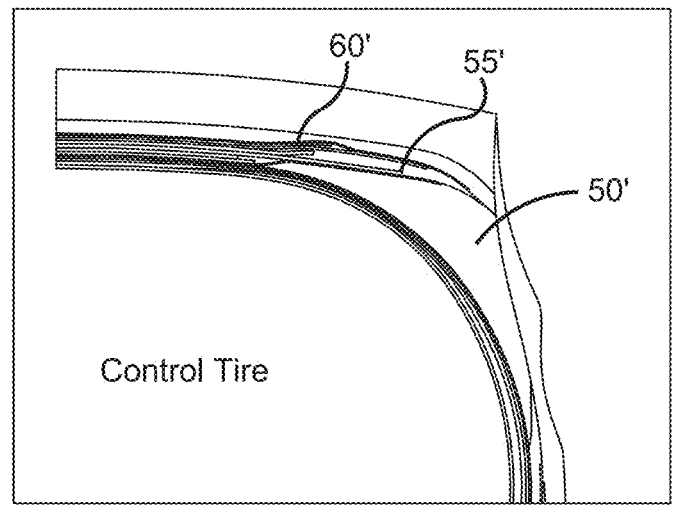
Figure 7B:
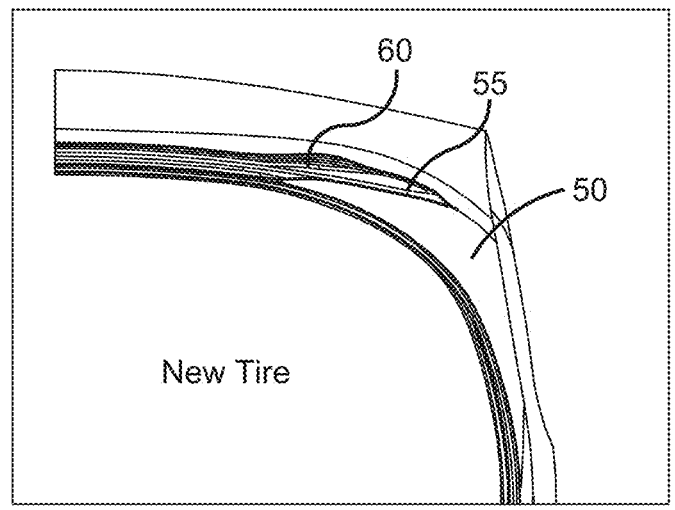
FIG. 7B illustrates a cross-sectional view of the shoulder portion of the tire of the present invention.

As shown in FIG. 7B, the tire of the present invention also has wider belts as compared to the control tire as shown in FIG. 7A. In particular, the third radially outer belt 55 is wider than the control tire's third belt. Furthermore, the fourth radially outer belt 60 is also wider than the control tire's fourth belt. Preferably, the width of the fourth belt ranges from 744 to 780 mm, and more preferably 760 to 770 mm. Preferably, the fourth belt width is 55 to 65% of the tread arc width. The wider belts result in lower rolling resistance, reduced shoulder length, less deflection, less heat and a more evenly distributed footprint, based upon FEA analysis. The wider belt widths also result in an increased lateral spring rate.

Figure 11B:
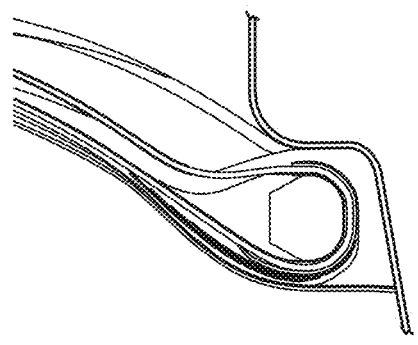
FIG. 11B illustrates the cross-sectional view of the bead and flange area of the tire of the present invention at 120% load.
Figure 11A:
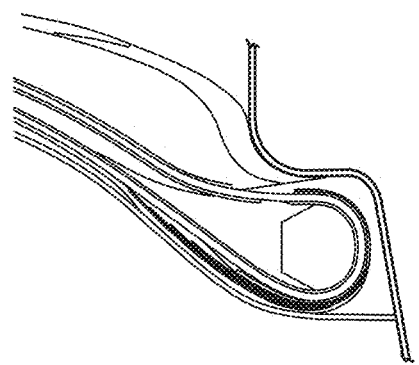

AS shown in FIG. 2b vs 2a, the bead apex 80 has a reduced radial height. The bead apex 80 height is preferably in the range of 160-260 mm, more preferably 170-200 mm, and more preferably in the range of 175-195. The apex of the invention is also preferably made of two compounds, and has a more curved axially outer face 82. As shown in FIG. 11, the reduced height of the apex results in less deflection in the bead area over the flange under load. The tire of the present invention also has a thinner turn up pad 30 as compared to the control tire. The gauge of the turn up pad is preferably in the range of 35-46 mm, and more preferably in the range of 38-43 mm.

Figure 8B:
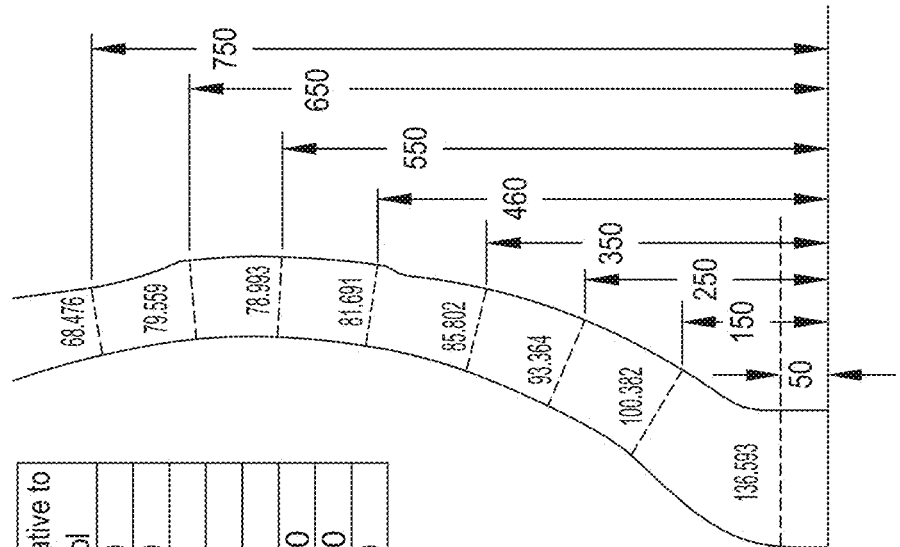
FIG. 8B illustrates a cross-sectional view of the lower sidewall gauge of the tire of the present invention.
Figure 8A:
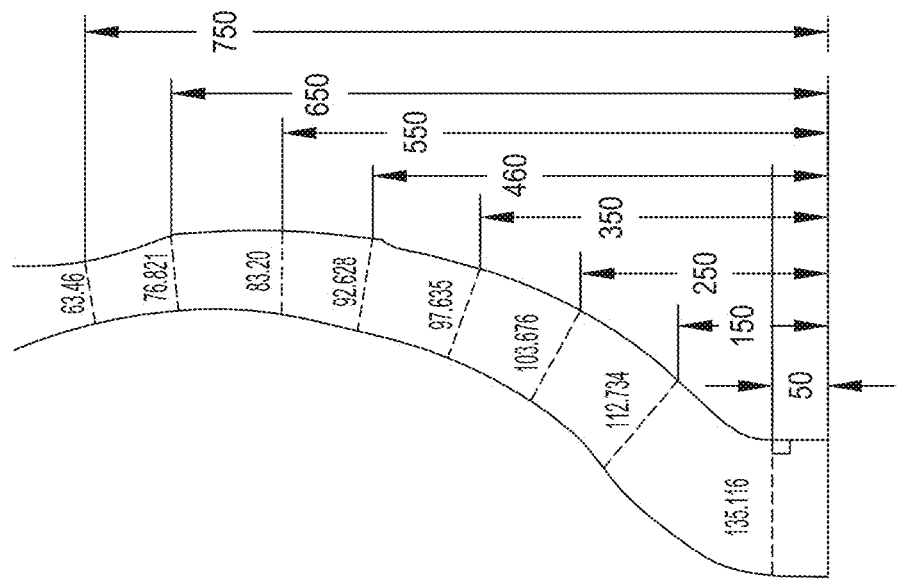
Figure 9:
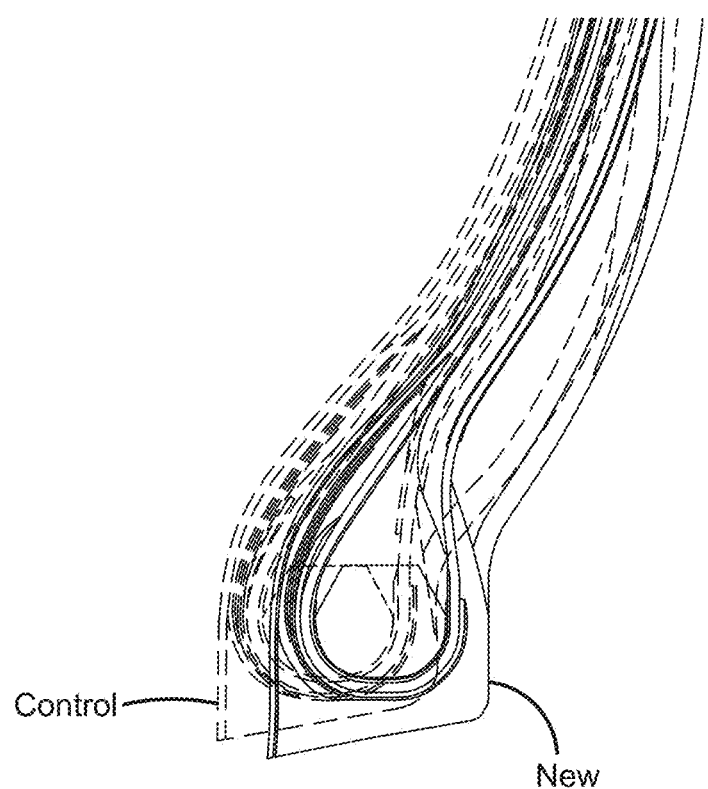
FIG. 9 illustrates the cross-sectional view of the cross-sectional profile of the bead area and lower sidewall of the tire of the present invention, while the control tire profile is shown in phantom.
Figure 10B:
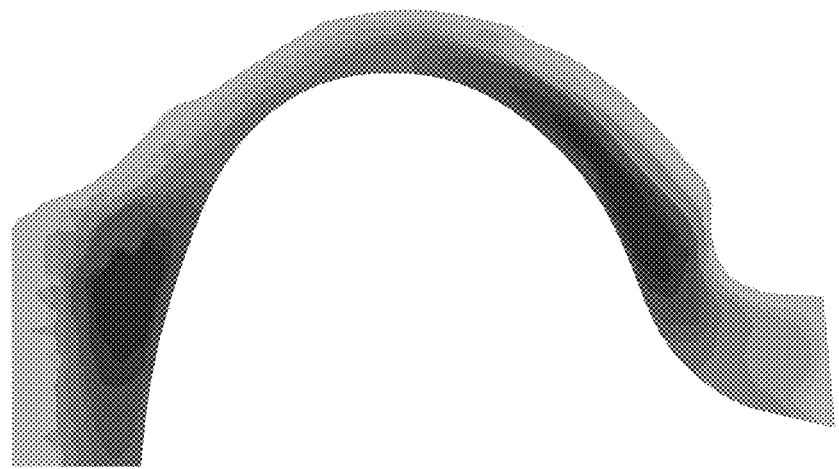
FIG. 10B illustrates a cross-sectional view of a heat map of the tire of the present invention, at the same conditions.
Figure 10A:
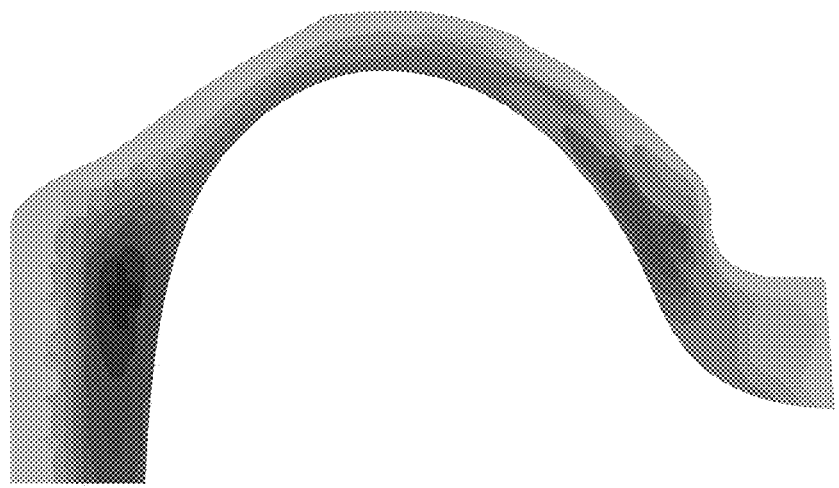

In order to reduce the strain in the lower sidewall of the tire, the gauge of the sidewall has been reduced. See FIG. 8 which illustrates the lower sidewall gauge of the tire. As shown in FIG. 8, the tire sidewall gauge is substantially reduced in the 150 mm to the 460 mm height from cavity baseline. The reduced gauge of the tire sidewall reduces the heat load, as shown in FIG. 10B as compared to the control tire of FIG. 10A. The max temperature in the belt edge dropped by 5 degrees C., while the lower sidewall temperature dropped by 10 degrees C.

The tire of the present invention results in a lower rolling resistance tire, with less heat generation and a more rounder footprint, as shown in FIGS. 10-13.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A heavy-duty tire having a nominal rim diameter of 35 inches or more, wherein said heavy duty tire further comprises a carcass, a tread located radially outward of the carcass, wherein the tread has a multi radius tread, wherein the tread has a first radius of curvature R1 in the range of 2200-2500 mm, a second radius of curvature R2 that is less than R1 and is in the range of 1600-2100 mm, and a third radius of curvature R3 that is in the range of 1000-1500 mm, wherein the carcass further includes sidewalls which terminate in bead area, wherein said tire has a molded base width in the range of 44-50 inches, wherein the tread has a shoulder drop in the range of 64 mm to 120 mm, wherein the tire further includes a shoulder wedge, wherein a gauge of the shoulder wedge ranges from 70-89 mm.

2. The heavy-duty tire of claim 1 wherein the gauge of the shoulder wedge ranges from 75-85 mm.

3. The heavy-duty tire of claim 1 further comprising a belt package of four belts, wherein the width of the radially outermost belt ranges from 744 to 780 mm.

4. The heavy-duty tire of claim 3 wherein the width of the radially outermost belt ranges from 760 to 770 mm.

5. The heavy-duty tire of claim 3 wherein the radially outermost belt width is 55% to 65% of the tread arc width.

6. The heavy-duty tire of claim 1 further including a turn up pad, wherein the gauge of the turn up pad is in the range of 35-46 mm.

7. The heavy-duty tire of claim 6 wherein the gauge of the turn up pad is in the range of 38-43 mm.

8. The heavy-duty tire of claim 6 wherein the gauge of the turn up pad is in the range of 40-43 mm.

9. The heavy duty tire of claim 1 wherein the heavy-duty tire has an apex having a radial height in the range of 160-260 mm.

\* \* \* \* \*